(12) United States Patent
Ellis

(10) Patent No.: US 7,124,532 B1
(45) Date of Patent: Oct. 24, 2006

(54) INFLATABLE DECOY WITH STAND

(76) Inventor: Paul D. Ellis, P.O. Box 3486, Bozeman, MT (US) 59772

( * ) Notice: Subject to any disclaimer, the term of this patent is extended or adjusted under 35 U.S.C. 154(b) by 0 days.

(21) Appl. No.: 11/251,075

(22) Filed: Oct. 14, 2005

Related U.S. Application Data

(60) Provisional application No. 60/618,877, filed on Oct. 14, 2004.

(51) Int. Cl.
*A01M 31/06* (2006.01)

(52) U.S. Cl. .................................. 43/2; 43/3

(58) Field of Classification Search ............. 43/2, 43/3, 21.2; 42/94; 46/44; 211/85, 104, 211/105, 168; A01M 31/06
See application file for complete search history.

(56) References Cited

U.S. PATENT DOCUMENTS

| | | | |
|---|---|---|---|
| 4,773,178 A | 9/1988 | Marck | |
| D356,620 S | 3/1995 | Weber et al. | |
| 5,675,926 A | 10/1997 | Manka | |
| 5,682,701 A | 11/1997 | Gammon | |
| 5,797,208 A | 8/1998 | Lessa | |
| 5,826,364 A | 10/1998 | Bitting | |
| 6,532,693 B1 | 3/2003 | Sides | |
| 2002/0108289 A1 | 8/2002 | Sides | |

*Primary Examiner*—Darren W. Ark
*Assistant Examiner*—John D. Holman
(74) *Attorney, Agent, or Firm*—Richard C. Conover

(57) ABSTRACT

An inflatable decoy having a main body portion, a connected head portion, a connected rear portion and at least two depending leg portions. A supporting stand is used to support the decoy system and includes a pair of rods which are hingedly mounted to an elongate bracket member so that the rods can hingedly extend outwardly from the elongate bracket member. A strap is mounted to the elongate bracket member and is sized to be positioned around the main body portion of the inflatable decoy. A connector is included for releasably securing the two free ends of the strap together once the strap is positioned around the main body portion of the inflatable decoy. The leg portions of the inflatable decoy are positioned on a ground surface and the pair of rods are swung outwardly with the distal ends of the rods positioned to rest on the ground surface.

6 Claims, 3 Drawing Sheets

INFLATABLE DECOY WITH STAND

This application claims the benefit of provisional application Ser. No. 60/618,877 filed Oct. 14, 2004.

BACKGROUND OF INVENTION

The present invention relates to an inflatable decoy provided with a stand to secure the decoy in an upright position.

Inflatable decoys are known such as shown in U.S. Pat. No. 4,773,178 to Marek; U.S. Pat. No. 5,797,208 to Lessa and U.S. Pat. No. 6,532,693 to Sides.

When hunting big game, it is advantageous to provide a decoy having a general shape of the animal being hunted and providing a place where the hunter can remain concealed behind the decoy so that the target animal comes within close range of the vantage point. It is also advantageous to have an inflatable decoy which will stand alone and will not blow down during windy conditions. The present invention provides an inflatable decoy which is easily transportable and when set up in the field provides an inflatable decoy which is stable even in windy conditions.

SUMMARY OF THE INVENTION

The present invention includes a inflatable decoy having a main body portion, a connected head portion, a connected rear portion and at least two depending leg portions. A supporting stand is used to support the decoy system and includes a pair of rods which are hingedly mounted to an elongate bracket member so that the rods can hingedly extend outwardly from the elongate bracket member. A strap is mounted to the elongate bracket member and is sized to be positioned around the main body portion of the inflatable decoy. A connector is included for releasably securing the two free ends of the strap together once the strap is positioned around the main body portion of the inflatable decoy. In use, the leg portions of the inflatable decoy are positioned to rest on a ground surface and the pair of rods are swung outwardly away from the inflatable decoy and the distal ends of the rods positioned to rest on the ground surface.

BRIEF DESCRIPTION OF THE DRAWINGS

In order that the invention may be clearly understood and readily carried into effect, a preferred embodiment of the invention will now be described, by way of example only, with reference to the accompanying drawings wherein.

DESCRIPTION OF A PREFERRED EMBODIMENT

Figure 1:
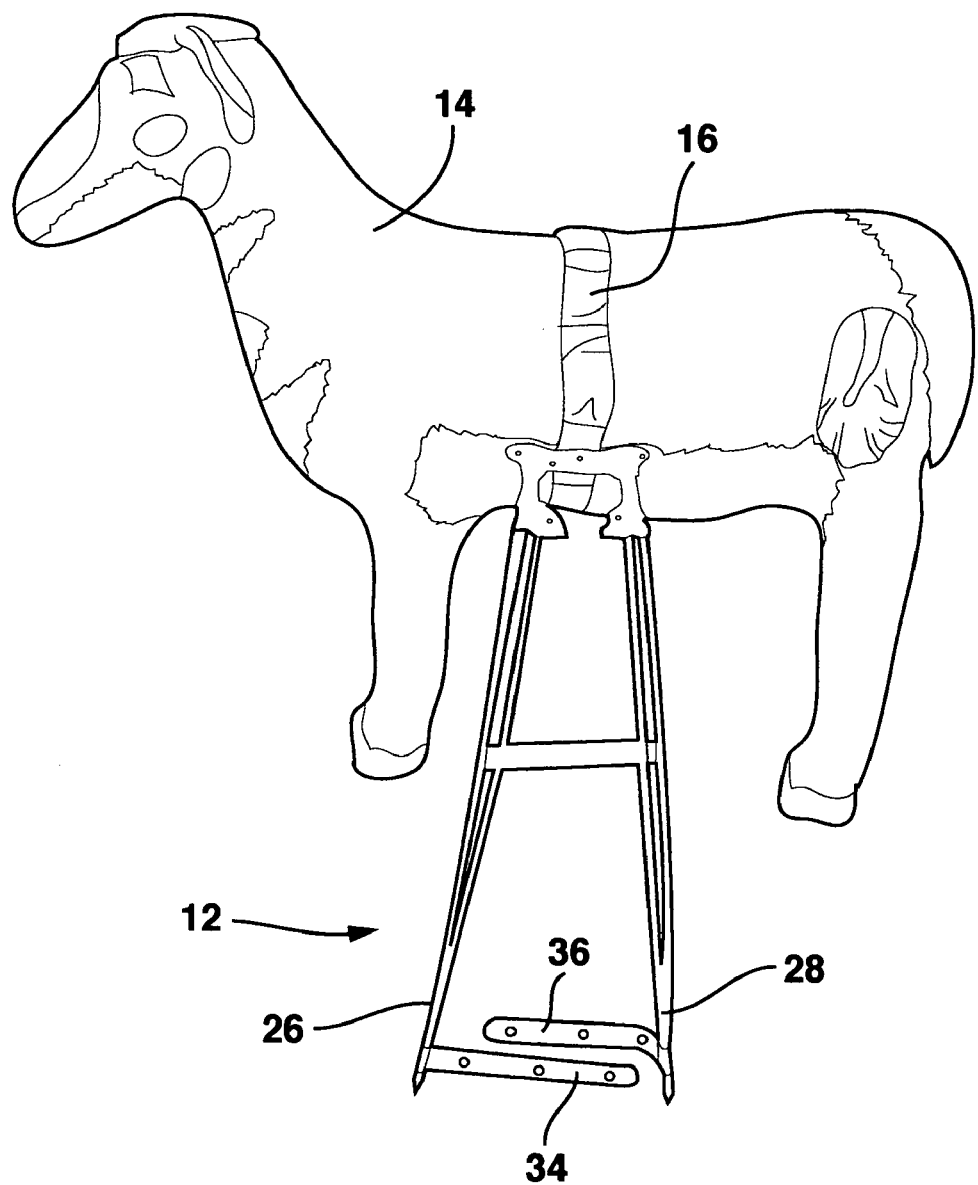
FIG. 1 is a perspective view of an inflatable decoy with a stand according to the present invention.

An inflatable decoy with stand 10 is shown in FIG. 1. The invention 10 includes a stand 12 which is mounted to an inflatable decoy 14. As depicted in FIG. 1, the inflatable decoy 14 may be an antelope but it is intended that the stand 12 be used with other inflatable decoys of large game animals such as deer or elk. In a preferred embodiment the decoy 14 is constructed of a vinyl material with a suede finish. The decoy 14 has a head portion, a main body portion, a rear portion and at least a pair of leg portions.

The stand 12 is shown in FIGS. 1–4. The stand 12 includes a strap 16 for mounting the stand 12 to the inflatable decoy 14 as shown in FIG. 1. In a preferred embodiment, a male buckle 18 slidably mounted at one end of the strap 16 and a female buckle 20 slidably mounted to the opposite end of strap 16 are used to connect the free ends of the straps together. Other devices such as Velcro straps could be used to connect the free ends of the straps together. Such other devices are included within the scope of the present invention.

The stand 12 further includes a bracket 22. The strap 16 is mounted to the bracket 22 with a clip 24 shown in FIGS. 2 and 3.

Figure 2:
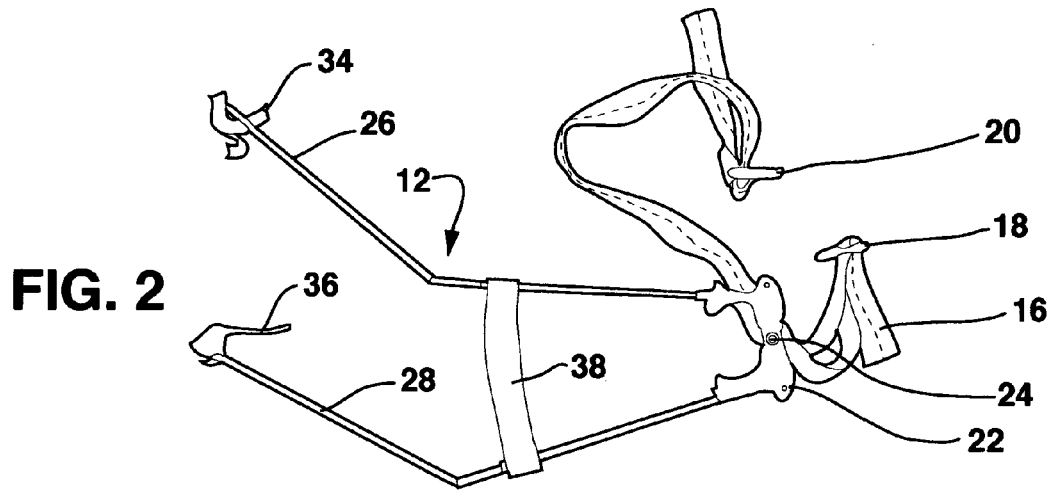
FIG. 2 is a perspective view of the stand shown in FIG. 1.
Figure 3:
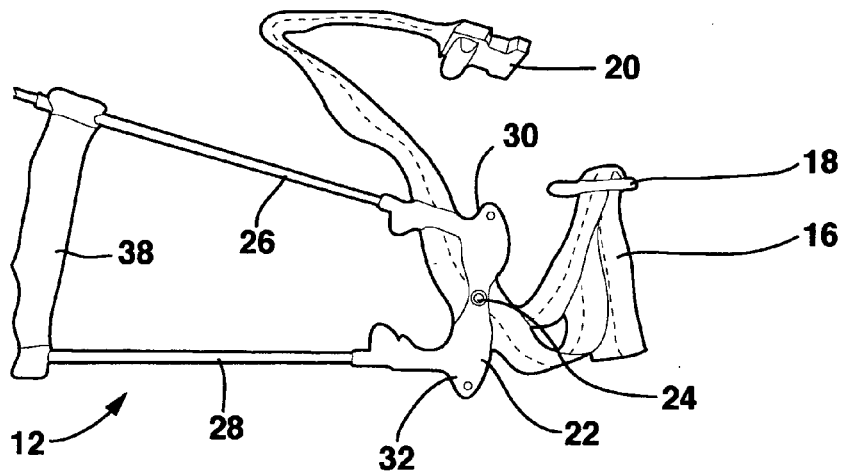
FIG. 3 is a detail view of an end of the stand shown in FIG. 2.

The stand 12 further includes a pair of collapsible legs 26 and 28. Each of the legs 26 and 28 are comprised of two hollow rod segments as shown in FIG. 2. Each leg 26 and 28 has an interior bungee cord which is mounted in a conventional manner to allow segments of the legs to be separated and then to be folded one upon the other. The leg segments can then be aligned and the bungee cord used to connect the leg segments together to form a single leg as shown in FIG. 1, all in a conventional shock corded manner. One end of each of the legs 26 and 28 is hingedly mounted to the bracket 22 with hinges 30 and 32, respectively.

Figure 5:
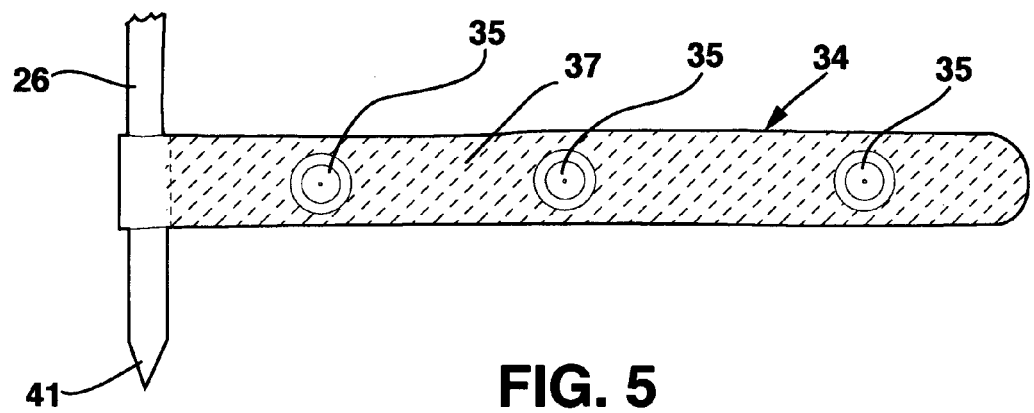
FIG. 5 is a detail front view of a strap used with the present invention.
Figure 6:
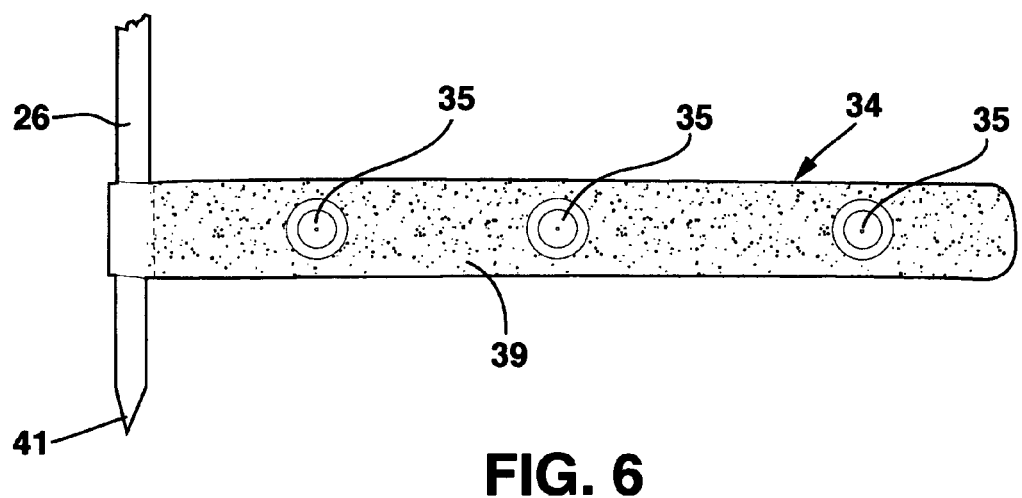
FIG. 6 is a detail rear view of the strap shown in FIG. 5.

A bracing strap 34 is secured to a distal end of leg 26 and an identical bracing strap 36 is similarly secured to the distal end of leg 28 as shown in FIG. 2. The strap 34 includes a Velcro hook portion provided at one end of the strap and a Velcro loop portion is provided at the opposite end of strap 34. Similarly, the strap 36 has a Velcro hook portion located at one end and at the opposite end a Velcro loop portion. A second embodiment of the straps 34 and 36 are shown in FIGS. 1, 5 and 6. In this embodiment the bracing straps 34 and 36 are provided with grommeted holes 35 as shown in FIGS. 5 and 6 through which an anchor (not shown) can be inserted for holding the decoy 14 to ground surface. The straps 34 and 35 in this embodiment are provided with Velcro hook portion 37 and Velcro loop portion 39. The ends of legs 26 and 28 are pointed at 41 to allow the legs to be more securely anchored to the ground surface as shown in FIGS. 5 and 6.

Figure 4:
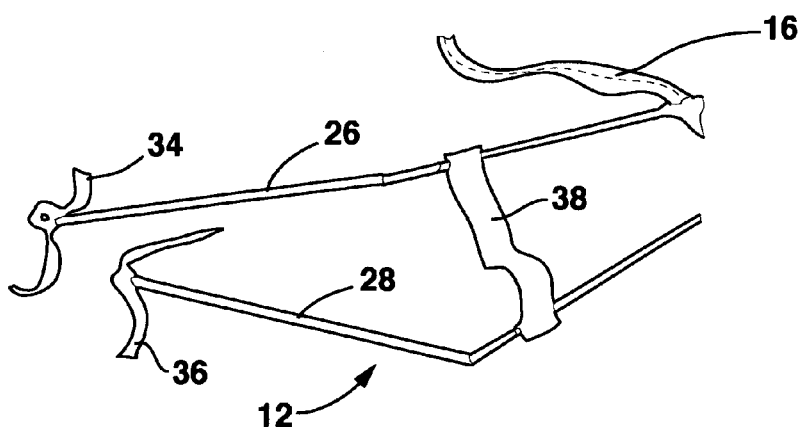
FIG. 4 is a detail view of the opposite end of the stand shown in FIG. 2.

A support strap 38 has one end mounted to the leg 26 and the opposite end mounted to leg 38 as shown in FIGS. 2 and 4.

In using the present invention the stand 12 is secured to the decoy 14 by wrapping the strap 16 around the body of the decoy and connecting the male buckle 18 with the female buckle 20. The ends of strap 16 are then pulled to snug the strap onto the body of the decoy 14. Next, the leg segments of legs 26 and 28 are snapped together to form a pair of legs as shown in FIG. 2. Decoy 14 is then set on the ground with the leg portions of the decoy 14 resting on the ground surface. The legs 26 and 28 are then hingedly moved outwardly and the free ends of the legs 26 and 28 positioned to rest on the ground surface. This arrangement provides a stand support for the decoy as shown in FIG. 1.

The present invention has particular use when hunting in a windy condition to prevent toppling of the decoy when being used. To further stabilize the decoy in a standing position, a hook portion of the bracing strap 34 is connected to the loop portion of bracing strap 36 and the hook portion of bracing strap 36 is connected to the loop portion of bracing strap 34. With this connection of the straps 34 and 36, the straps 34 and 36 provide a strap linkage between the ends of the legs 26 and 28. A hunter may then rest his foot on the straps 34 and 36, so connected, to prevent lateral movement of the decoy 14 in windy conditions. Further, a knee of the hunter can be pressed against the support strap 38 providing a more rigid support of the decoy 14. Further an anchor can be inserted through a hole 35 to secure the decoy 14 to the ground surface. The hunter, may then hide behind the decoy with the decoy secured in an upright position even in fairly windy conditions.

While the fundamental novel features of the invention have been shown and described, it should be understood that various substitutions, modifications, and variations may be made by those skilled in the art, without departing from the spirit or scope of the invention. Accordingly, all such modifications or variations are included in the scope of the invention as defined by the following claims:

I claim:

1. A decoy system comprising in combination:
   an inflatable decoy having a main body portion, a connected head portion, a connected rear portion and at least two depending leg portions; and
   a supporting stand comprising:
   a pair of rods each having a length greater than the depending leg portions of the inflatable decoy and each having a first end and a second end;
   an elongate bracket having a longitudinal axis and a first end and a second end;
   a first connector means mounted to the first end of the elongate bracket for hingedly connecting the first end of one of the rods to the elongate bracket and allowing hinged movement in a plane perpendicular to the longitudinal axis of the elongate bracket;
   a second connector means mounted to the second end of the elongate bracket for hingedly connecting the first end of the other rod to the elongate bracket and allowing hinged movement in a plane perpendicular to the longitudinal axis of the elongate bracket;
   a strap, having two free ends, mounted to the elongate bracket and having a length sufficient to extend around the main body portion of the inflatable decoy;
   the strap positioned to extend around the main body portion of the inflatable decoy; and
   means for releaseably securing the two free ends of the strap together;
   whereby when the leg portions of the inflatable decoy are positioned to rest on a ground surface and the pair of rods are swung outwardly away from the inflatable decoy and the second ends of the rods positioned to rest on the ground surface, the inflatable decoy is supported in an upright position with respect to the ground surface.

2. The decoy system according to claim 1 further including a support strap positioned in spaced apart relation with the elongate bracket, the support strap having one end connected to one of the rods and a second end connected to the other rod.

3. The decoy system according to claim 1 further including a bracing strap having one end connected to one of the rods adjacent the second end of the one rod and a second bracing strap having one end connected to the other rod adjacent the second end of the other rod, the bracing straps provided with at least one hole for receiving an anchor for securing the second end of a respective rod to the ground surface.

4. The decoy system according to claim 3 wherein the bracing straps are each provided with a hook portion on one side and a loop portion on the opposite side whereby the bracing straps can be connected together using the loop portion of one strap and the hook portion of the other strap.

5. The decoy system according to claim 1 wherein the second ends of the rods are pointed.

6. The decoy system according to claim 1 wherein each rod has two segments which are shock corded together.

* * * * *